United States Patent
Yoshida et al.

(10) Patent No.: US 9,601,911 B2
(45) Date of Patent: Mar. 21, 2017

(54) WIRE HARNESS

(71) Applicant: Yazaki Corporation, Tokyo (JP)

(72) Inventors: Hiroyuki Yoshida, Makinohara (JP); Hideomi Adachi, Makinohara (JP); Yasuhiko Fujimoto, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 15/014,408

(22) Filed: Feb. 3, 2016

(65) Prior Publication Data

US 2016/0226230 A1  Aug. 4, 2016

(30) Foreign Application Priority Data

Feb. 4, 2015 (JP) ................................ 2015-020083

(51) Int. Cl.
 *H02G 3/04* (2006.01)
 *B60R 16/02* (2006.01)

(52) U.S. Cl.
 CPC ....... *H02G 3/0468* (2013.01); *B60R 16/0215* (2013.01); *H02G 3/0481* (2013.01); *H02G 3/0487* (2013.01)

(58) Field of Classification Search
 CPC ........ H02G 3/04; H02G 3/0406; B60R 16/02; B60R 16/0207

USPC ........................................................ 174/72 A
See application file for complete search history.

(56) References Cited

U.S. PATENT DOCUMENTS

| | | | |
|---|---|---|---|
| 5,703,330 A * | 12/1997 | Kujawski | B60R 16/0215 138/157 |
| 2012/0261185 A1* | 10/2012 | Murao | B60R 16/0207 174/72 A |
| 2013/0075155 A1* | 3/2013 | Kawai | B60R 16/0215 174/70 C |

FOREIGN PATENT DOCUMENTS

JP            2011138740 A        7/2011

\* cited by examiner

*Primary Examiner* — Timothy Thompson
*Assistant Examiner* — Michael F McCallister
(74) *Attorney, Agent, or Firm* — Sughrue Mion, PLLC

(57) ABSTRACT

A wire harness includes a first conductive path, a second conductive path, a first exterior member having a tubular shape and accommodating the first conductive path, and a second exterior member having a tubular shape and accommodating the second conductive path. An exterior accommodating groove is formed in a wall of the first exterior member. The exterior accommodating groove is recessed inward of the first exterior member. The second exterior member is accommodated in the exterior accommodating groove so as to be parallel to the first exterior member.

5 Claims, 8 Drawing Sheets

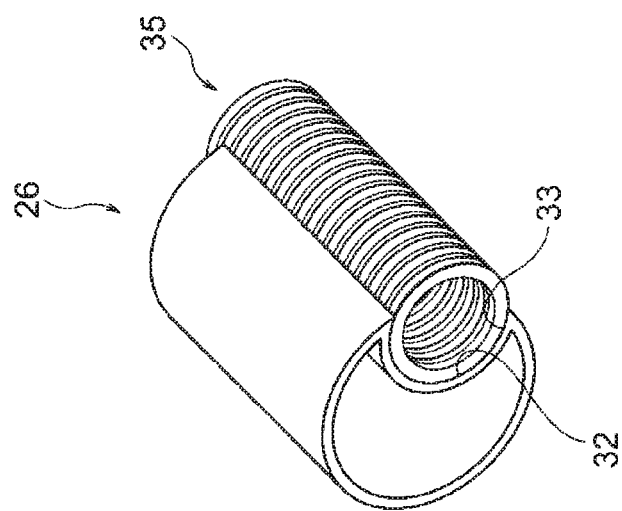
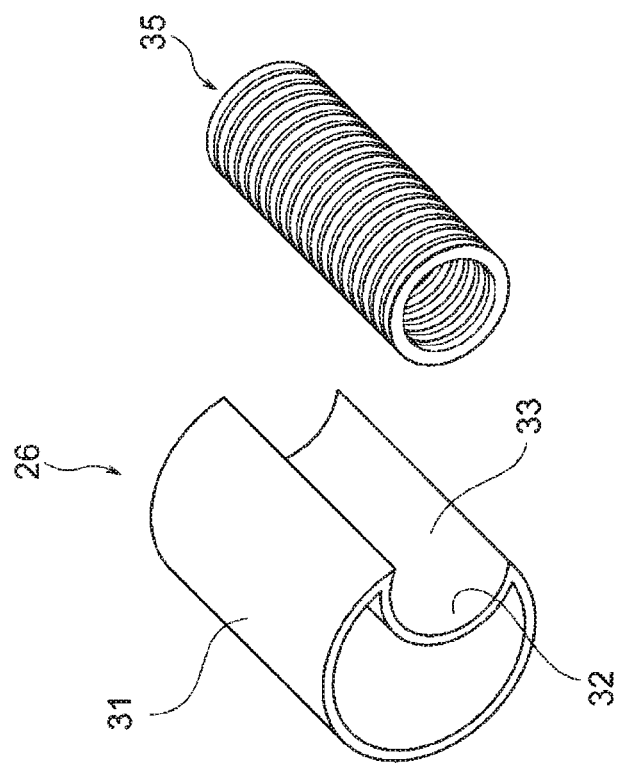
Fig. 3A
Fig. 3B

WIRE HARNESS

CROSS REFERENCE TO RELATED APPLICATIONS

This application is based on Japanese Patent Application (No. 2015-020083) filed on Feb. 4, 2015, the contents of which are incorporated herein by way of reference.

BACKGROUND

The present invention relates to a wire harness in which at least portions of exterior members are disposed parallel to each other.

For example, Patent Document 1 discloses a wire harness through which high-voltage devices mounted in an electric vehicle are electrically connected to each other. The wire harness disclosed in Patent Document 1 is configured to include two long bellows-like tubes (exterior members) and shielded electrical wires which are respectively inserted into the bellows-like tubes. Each of the two bellows-like tubes has a round sectional shape, and is disposed parallel to each other so as to come into contact with each other. The two bellows-like tubes parallel to each other are fixed together by wrapping tape or a band around the two bellows-like tubes at a proper position.

[Patent Document 1] JP-A-2011-138740

SUMMARY

An object of the present invention is to provide a small size of wire harness with a small width.

According to one advantageous aspect of the invention, there is provided a wire harness comprising:
a first conductive path;
a second conductive path;
a first exterior member having a tubular shape and accommodating the first conductive path; and
a second exterior member having a tubular shape and accommodating the second conductive path,
wherein an exterior accommodating groove is formed in a wall of the first exterior member,
the exterior accommodating groove is recessed inward of the first exterior member, and
the second exterior member is accommodated in the exterior accommodating groove so as to be parallel to the first exterior member.

The exterior accommodating groove may hold the second exterior member.

A positional offset restricting structure portion restricting an axial positional offset of the second exterior member may be provided in the exterior accommodating groove.

The first exterior member may include a straight tubular portion in which the first conductive path is arranged straightly, and the exterior accommodating groove may be formed in the straight tubular portion.

A shape of the exterior accommodating groove may be conformed to a part of an exterior shape of the second exterior member.

BRIEF DESCRIPTION OF DRAWINGS

FIG. 2A is a view of a first high-voltage wire harness, and FIG. 2B is a view of a second low-voltage wire harness.

FIGS. 3A and 3B show schematic views of a first exterior member and a second exterior member of the wire harness in FIG. 1, FIG. 3A is a view illustrating a state in which the first exterior member and the second exterior member are not yet disposed parallel to each other, and FIG. 3B is a view illustrating a state in which the first exterior member and the second exterior member are disposed parallel to each other.

FIG. 5A is a view illustrating a state in which the first exterior member and the second exterior member are not yet disposed parallel to each other, and FIG. 5B is a view illustrating a state in which the first exterior member and the second exterior member are disposed parallel to each other.

DETAILED DESCRIPTION OF EXEMPLIFIED EMBODIMENTS

In the related art in Patent Document 1, since the two bellows-like tubes are disposed parallel to each other, even if the two bellows-like tubes are in contact with each other, the total width of the two bellows-like tubes may be large, and the two bellows-like tubes may form a large size of wire harness. For this reason, a wide space is required to be ensured, which is a problem.

The present invention is made in light of this problem, and an object of the present invention is to provide a small size of wire harness with a small width.

According to an embodiment of the present invention, a wire harness is configured to include one or multiple first conductive paths; one or multiple second conductive paths; a first tubular exterior member accommodating the first conductive path; and a tubular second exterior member accommodating the second conductive path. An exterior accommodating groove is formed in the first exterior member. The second exterior member is accommodated in the exterior accommodating groove. The exterior accommodating groove enables the two exterior members to be disposed parallel to each other such that the width of the wire harness is reduced. A holding structure portion and a positional offset restricting structure portion are formed in the exterior accommodating groove. The holding structure portion holds the second exterior member by using the exterior accommodating groove itself, and the positional offset restricting structure portion restricts the axial positional offset of the second exterior member.

Figure 1:
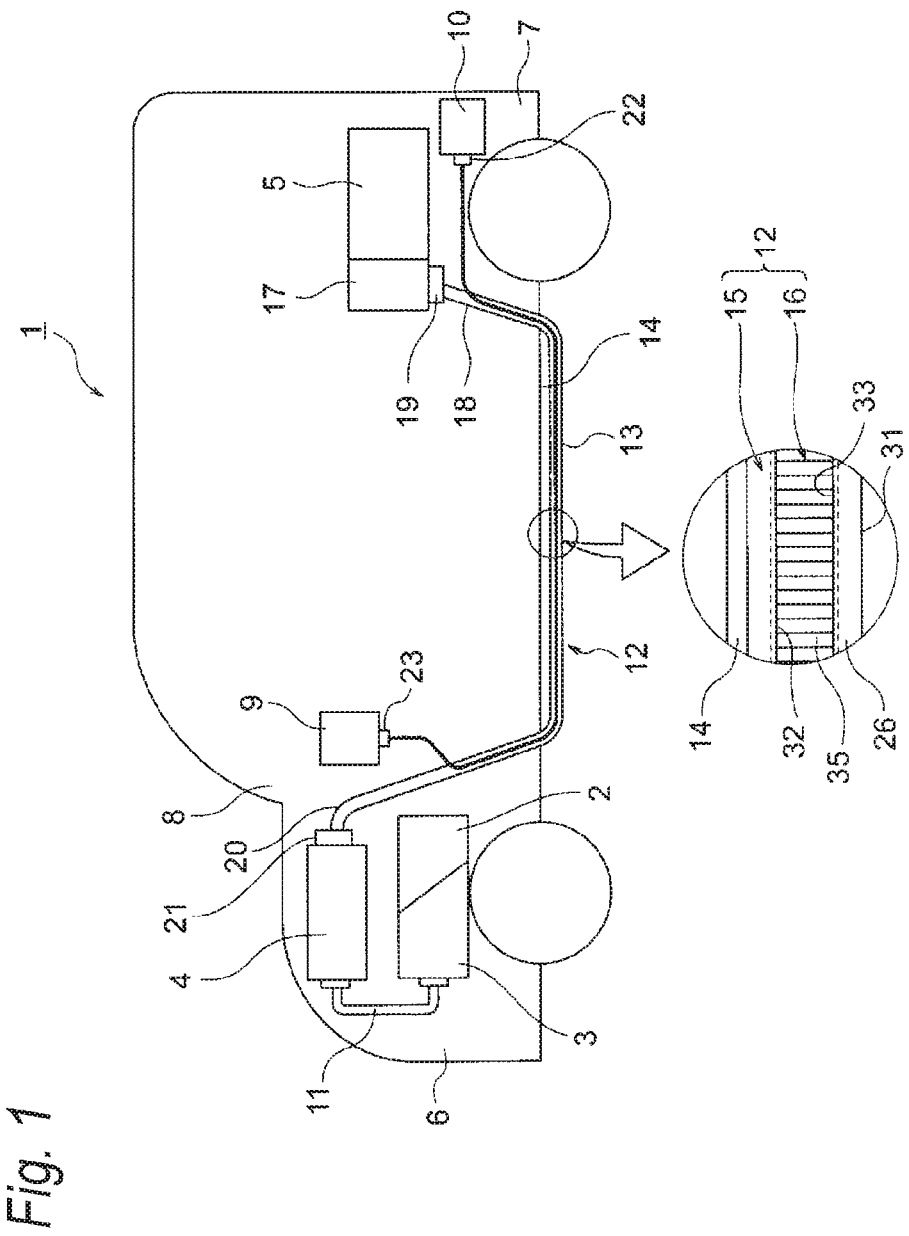
FIG. 1 is a schematic view (a view in the circle illustrates the configuration of a wire harness) illustrating the routing state of a wire harness of the present invention.
Figure 2A:
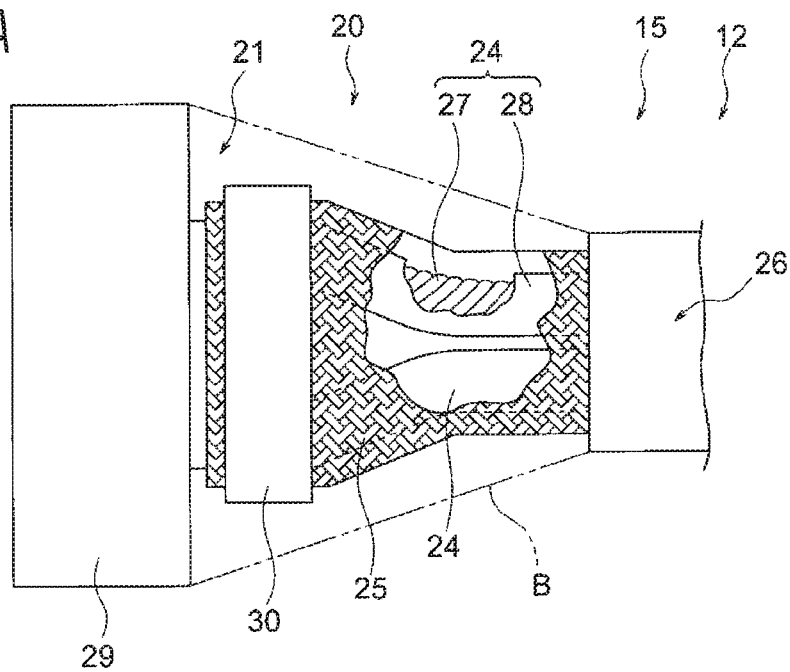
FIGS. 2A and 2B show views illustrating the configuration of a harness end of the wire harness in FIG. 1.
Figure 2B:
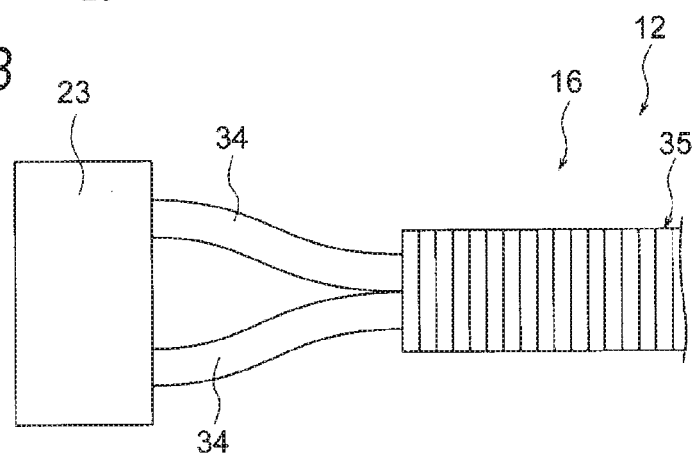
Figure 4A:
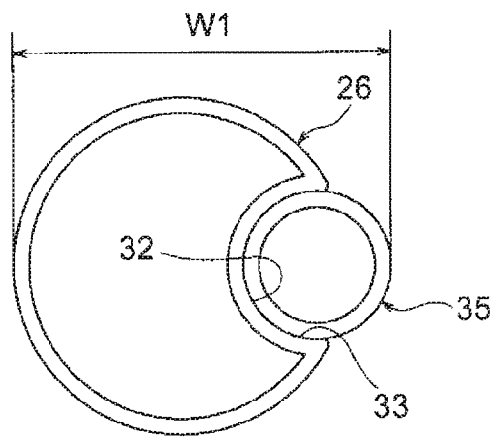
FIG. 4A is a view illustrating a state in which the width of the wire harness is reduced by the use of the first exterior member and the second exterior member in FIGS. 3A and 3B, and FIGS. 4B and 4C are views illustrating a comparative example.
Figure 4B:
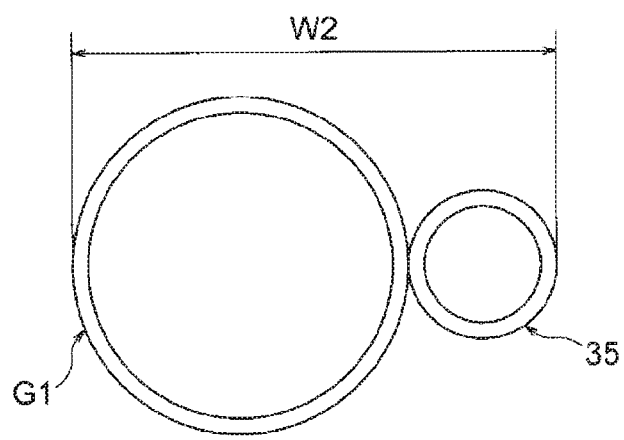
Figure 4C:
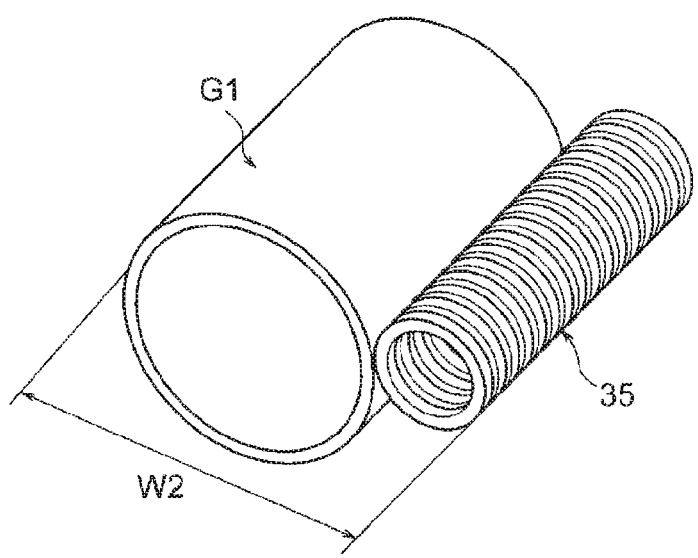

Hereinafter, an embodiment will be described with reference to the accompanying drawings. FIG. 1 is a schematic view illustrating the routing state of a wire harness of the present invention. FIGS. 2A and 2B show views illustrating the configuration of the wire harness in FIG. 1. FIGS. 3A and 3B show schematic views of a first exterior member and a second exterior member of the wire harness in FIG. 1. FIGS. 4A to 4C show views illustrating a state in which the width of the wire harness is reduced by the use of the first exterior member and the second exterior member in FIGS. 3A and 3B, and a view illustrating a comparative example.

The embodiment of the present invention is applied to a wire harness routed in a hybrid vehicle (may be an electric vehicle, a typical engine-driven vehicle, or the like).

Regarding Configuration of Hybrid Vehicle 1

In FIG. 1, reference sign 1 represents a hybrid vehicle. The hybrid vehicle 1 is a vehicle driven by driving power from a combination of two power sources, that is, an engine 2 and a motor unit 3. Electrical power is supplied from a battery 5 (battery cell pack) to the motor unit 3 via an inverter unit 4. In the embodiment, the engine 2, the motor unit 3, and the inverter unit 4 are mounted in an engine compartment 6 in the vicinity of the front wheels and the like. The battery 5 is mounted in a vehicle rear portion 7 in the vicinity of the rear wheels and the like (the battery 5 may be mounted in a vehicle interior that is present on a rear side of the engine compartment 6). In addition, multiple auxiliary components (devices) 9 are mounted in a vehicle front portion 8. Electrical power is supplied to the auxiliary component 9 from a low-voltage battery 10 in the vehicle rear portion 7.

The motor unit 3 is configured to include a motor and a generator. The inverter unit 4 is configured to include an inverter and a converter. The motor unit 3 is a motor assembly including a shielded case. The inverter unit 4 is an inverter assembly including a shielded case. The battery 5 is a Ni—MH battery or a Li-ion battery, and is built as a module. A power storage device such as a capacitor can also be used as the battery 5. Naturally, the battery 5 is not restricted to a specific type insofar as the battery 5 can be used in the hybrid vehicle 1 or an electric vehicle. A well-known battery is used as the low-voltage battery 10.

The hybrid vehicle 1 includes a high-voltage motor harness 11 for electrical power supply through which the motor unit 3 is connected to the inverter unit 4. The hybrid vehicle 1 further includes a long wire harness 12 of the present invention, through which the inverter unit 4 is connected to the battery 5 and the auxiliary component 9 is connected to the low-voltage battery 10.

Regarding Outline of Wire Harness 12

An intermediate portion 13 of the wire harness 12 of the present invention is routed under a vehicle underfloor member 14 of the vehicle (a vehicle body). The intermediate portion 13 is routed parallel to and along the vehicle underfloor member 14. The vehicle underfloor member 14 is a well-known body (vehicle body), and a so-called panel member, and through holes are formed at predetermined positions in the vehicle underfloor member 14. The wire harness 12 is water-tightly inserted into the through holes. The wire harness 12 is a long wire harness routed through the vehicle underfloor member 14 as described above, and is configured to include a first high-voltage wire harness 15 and a second low-voltage wire harness 16.

The first wire harness 15 of the wire harness 12 is electrically connected to the battery 5 via a junction block 17 provided in the battery 5. A well-known shielded connector 19 is electrically connected to the junction block 17, and is provided at a rear harness end 18 of the first wire harness 15. The first wire harness 15 of the wire harness 12 is electrically connected to the inverter unit 4 via a shielded connector 21 provided at a front harness end 20.

In contrast, the second wire harness 16 of the wire harness 12 is electrically connected to the low-voltage battery 10 via a well-known battery terminal 22. The second wire harness 16 of the wire harness 12 is electrically connected to the auxiliary component 9 via a well-known connector 23.

Regarding Configuration of Wire Harness 12

In FIGS. 1 to 2B, as described above, the wire harness 12 is configured to include the first high-voltage wire harness 15; the second low-voltage wire harness 16; a fixing member (for example, a clamp) fixing these wire harnesses to the vehicle at a predetermined position; and a water infiltration prevention member (for example, grommet) preventing the infiltration of moisture. In the embodiment, the first wire harness 15 and the second wire harness 16 are disposed such that at least the respective intermediate portions 13 are parallel to each other. As can be known from the following description, the characteristic portion of the present invention is applied to the portions parallel to each other.

Regarding Configuration of First Wire Harness 15

The first wire harness 15 is configured to include two first conductive paths 24; a braid 25 (shielding member) collectively covering the two first conductive paths 24; the shielded connectors 19 and 21 respectively provided at the ends (the harness ends 18 and 20) of the first conductive paths 24; and a first exterior member 26 accommodating and protecting the first conductive paths 24 covered with the braid 25. Reference sign B represents a rubber boot of the harness end 20.

Regarding First Conductive Path 24

Each of the first conductive paths 24 is configured to include a conductor 27 having conductivity, and an insulator 28 having insulating properties, with which the conductor 27 is coated. The conductor 27 is made of copper, a copper alloy, aluminum, or an aluminum alloy, and has a circular sectional shape. In the embodiment, the conductor 27 made of aluminum (as an example) is adopted in that the aluminum has the advantages of low cost and low weight. The conductor may have either a conductor structure in which wire strands are twisted together, or a bar-shaped conductor structure (for example, a conductor structure in which the conductor is a single flat square-shaped core or a single round core, and in this case, an electrical wire also has a bar shape) in which the sectional shape of the conductor is rectangular or circular (round). The insulator 28, made of a resin material having insulting properties, is extrusion-molded over the outer surface of the conductor 27.

In the embodiment, the first conductive path 24 adopts the configuration of a well-known high-voltage electrical wire; however, the present invention is not limited to that configuration in the embodiment. That is, a conductive path in which an insulator is provided over the surface of a well-known busbar may be adopted. A well-known shielded electrical wire may be adopted as the first high-voltage conductive path 24 (in this case, the braid 25 to be described later will not be required). In the embodiment, the number of first conductive paths 24 is two, but is not limited to two. That is, the number of first conductive paths 24 may be three or one.

The insulator 28 is extrusion-molded over the outer circumferential surface of the conductor 27 with a thermoplastic resin material. The insulator 28 is formed as a coating member having a circular sectional shape. The insulator 28 is formed to have a predetermined thickness. Various types of well-known materials can be used as the thermoplastic resin, and for example, the material of the insulator 28 is appropriately selected from high-polymer materials such as polyvinylchloride resin, polyethylene resin, and polypropylene resin.

Regarding Braid 25 as Shielding Member

The braid 25 is an electromagnetic shielding metal component (shielding member counteracting electromagnetic waves) that collectively covers the two first conductive paths 24. A well-known cylindrical braid in which a number of threads are woven together is adopted as the braid 25. The braid 25 is formed to have substantially the same length as the total length of the two first conductive paths 24. An end portion of the braid 25 is connected and fixed to a shielding shell 29 (to be described later) of the shielded connector 19. Conductive metal foil, a member including this metal foil, and the like may be adopted as shielding members other than the braid 25. The shielding member is not limited to a specific type insofar as the shielding member is capable of counteracting electromagnetic waves (the first exterior member 26 can be made of metal, and used as a shielding member).

Regarding Shielded Connector 19

The shielded connector 19 is configured to include conductive terminals (not illustrated); an insulating housing (not illustrated); the conductive shielding shell 29; and a metal caulking ring 30. The shielding shell 29 is a metal member provided on the outside of the housing. The shielding shell 29 includes a fixing portion (not illustrated), and is assembled to the inverter unit 4, a shielded case of the junction block 17, or the like via this fixing portion. The shielding shell 29 includes a cylindrical portion with which an end of the braid 25 is covered. The caulking ring 30 is provided to ground the end of the braid 25 to the cylindrical portion of the shielding shell 29. The caulking ring 30 is caulked and fixed to the end of the braid 25.

Regarding First Exterior Member 26

The first exterior member 26 is a resin-molded product (as an example) (may be a metal product) molded with an insulating resin material, and is formed in the shape of a tube to be able to accommodate and protect the first conductive paths 24 covered with the braid 25. The first exterior member 26 is formed to have a long length such that the first exterior member 26 passes through the vehicle underfloor member 14 and extends in a longitudinal direction of the vehicle. The first exterior member 26 includes a flexible tubular portion (refer to a flexible tubular portion 43 (to be described later) in FIG. 8) having flexibility, and a straight tubular portion 31 (refer to FIGS. 3A and 3B) as a straight-routed portion. In other words, the first exterior member 26 includes the flexible tubular portion which is bendable, and the straight tubular portion 31 having rigidity higher than that of the flexible tubular portion. The first exterior member 26 includes one or multiple flexible tubular portions, each of which has an appropriate length, and one or multiple straight tubular portions 31, each of which has an appropriate length. The flexible tubular portions and the straight tubular portions 31 are alternately and continuously disposed.

In FIGS. 3A and 3B, the first exterior member 26 includes an exterior accommodating groove 32 which is a characteristic portion of the present invention. The exterior accommodating groove 32 is formed in a portion (for example, the straight tubular portion 31) of the first exterior member 26, in which the first exterior member 26 and a second exterior member 35 (to be described later) for the second wire harness 16 (refer to FIG. 1) can be disposed parallel to each other. The exterior accommodating groove 32 is formed into the shape of a groove made by recessing the wall of the first exterior member 26 inward. Specifically, the exterior accommodating groove 32 is formed into the shape of a groove made by recessing the wall inward in order for the recessed wall to have a circular arc shape and conform to the exterior shape of the second exterior member 35 (to be described later), and extending the recession perfectly straightly along the tube axis.

The exterior accommodating groove 32 is formed into a circular arc shape (as an example), the outer circumferential length of which is approximately ½ times the outer circumferential length of the second exterior member 35 (to be described later). The exterior accommodating groove 32 is formed into a shape in which the second exterior member 35 can be fitted into and held (gripped and held) in the exterior accommodating groove 32. That is, the exterior accommodating groove 32 is formed to include a holding structure portion 33. The holding structure portion 33 is formed as a structure portion preventing the falling off of the accommodated second exterior member 35 from the exterior accommodating groove 32. Even if the exterior accommodating groove 32 includes the holding structure portion 33, tape or band wrapping is effective in reliably preventing the falling off of the second exterior member 35.

The exterior accommodating groove 32 is not limited to the shape illustrated in FIGS. 3A and 3B. That is, the exterior accommodating groove 32 is not limited to a specific shape insofar as the parallel width (parallel height) of the wire can be reduced when the first exterior member 26 and the second exterior member 35 (to be described later) are disposed parallel to each other. This will be described in more detail with reference to FIGS. 4A to 4C.

FIG. 4A illustrates the shape of the present invention. In the present invention, the second exterior member 35 is inserted into and accommodated in the exterior accommodating groove 32 of the first exterior member 26 such that the second exterior member 35 is parallel to the first exterior member 26. As a result, it can be known that a width W1 is narrow. In contrast, FIGS. 4B and 4C illustrate a comparative example, in which a typical round pipe is adopted as a first exterior member G1. In the comparative example, a round pipe without a recession is adopted, and thus, it can be known that a width W2 in FIGS. 4B and 4C is wider than the width W1. The present invention is not limited to the shape illustrated in FIGS. 3A to 4A insofar as the exterior accommodating groove 32 is shaped to reduce the parallel width W1. Naturally, in order to help holding of the second exterior member 35, it is effective that the exterior accommodating groove 32 is recessed to conform to the exterior shape of the second exterior member 35 illustrated in FIGS. 3A to 4A.

Regarding Configuration of Second Wire Harness 16

In FIGS. 1 to 2B, the second wire harness 16 is configured to include two second conductive paths 34; the well-known battery terminal 22 and the well-known connector 23 provided at the ends of the two second conductive paths 34; and the second exterior member 35 accommodating and protecting the two second conductive paths 34.

Regarding Second Conductive Path 34 and Second Exterior Member 35

The second conductive path 34 is configured to include a conductor and an insulator with which the conductor is coated. Since the second conductive path 34 is a low-voltage conductive path, a well-known insulated wire is adopted as the second conductive path 34. In contrast, a corrugated tube (as an example) is adopted as the second exterior member 35. The second exterior member 35 is formed to have a round sectional shape in a direction perpendicular to the tube axis. The second exterior member 35 is formed in order for the entire second exterior member 35 to have flexibility. Since the second exterior member 35 is a corrugated tube as described above, the second exterior member 35 has a bellows-like tubular shape. The bellows-like tubular shape is the shape of a tube having bellows-like recessed portions and bellows-like protruding portions formed in a circumferential direction, and in this shape, the bellow-shaped recessed portions and the bellows-like protruding portions are alternately and continuously formed in a tube-axial direction. The second exterior member 35 is not limited to a specific shape insofar as the second exterior member 35 has a tubular shape having flexibility.

Effects of Present Invention

As described with reference to FIGS. 1 to 4C, in the wire harness 12 according to the present invention, the exterior accommodating groove 32 is formed in the first exterior member 26, and accommodates the second exterior member 35, and the two exterior members are disposed parallel to each other. Accordingly, the width of the wire harness 12 can be reduced to the extent that the exterior accommodating groove 32 of the first exterior member 26 accommodates the second exterior member 35. In other words, it is possible to reduce the width of the wire harness 12 by the dimension of a depth by which the second exterior member 35 is inserted into the exterior accommodating groove 32. As a result, according to the present invention, it is possible to further reduce the width and size of the wire harness 12 compared to the related art.

In addition, according to the present invention, the holding structure portion 33 is formed in the exterior accommodating groove 32, and thus it is possible to prevent the falling off of the accommodated second exterior member 35 from the exterior accommodating groove 32. According to the present invention, it is possible to hold the second exterior member 35 without using a separate member, and to reduce costs by simplifying the configuration.

Regarding Modification Examples

The present invention may be adopted in other examples to be described below. FIGS. 5A to 8 are schematic views illustrating other examples of the first exterior member and the second exterior member (FIGS. 6A to 7B contain views of comparative examples).

Figure 5A:
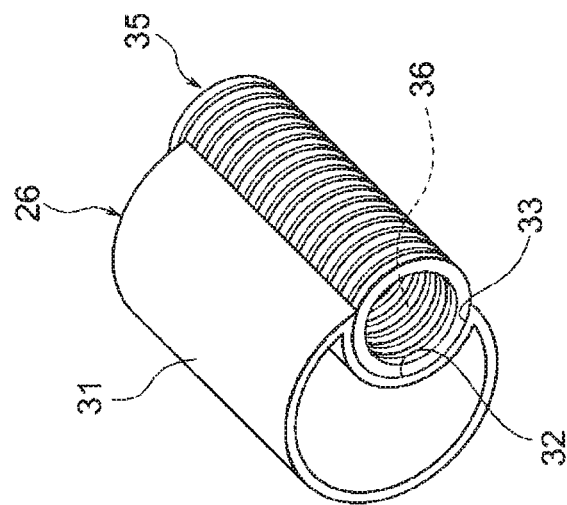
FIGS. 5A and 5B show schematic views illustrating another example of the first exterior member and the second exterior member.
Figure 5B:
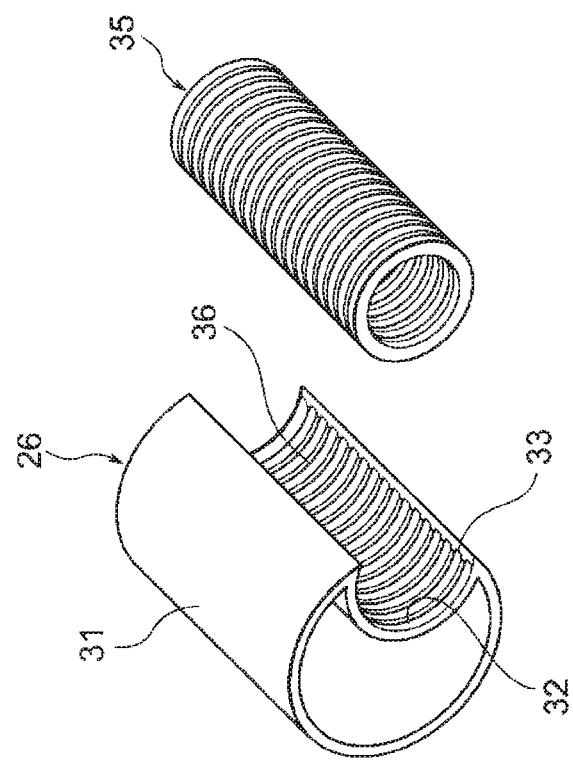

In FIGS. 5A and 5B, in addition to the holding structure portion 33, a positional offset restricting structure portion 36 is further formed in the exterior accommodating groove 32 of the first exterior member 26. The positional offset restricting structure portion 36 is formed as a portion restricting the axial positional offset of the second exterior member 35. In the embodiment, the positional offset restricting structure portion 36 is formed into a shape to conform to the bellows-like shape of the second exterior member 35. Specifically, the positional offset restricting structure portion 36 is formed into a shape in which recessed portions and protruding portions are alternately and continuously disposed in a tube-axial direction. Owing the formation of the positional offset restricting structure portion 36, it is possible to restrict the axial positional offset of the second exterior member 35 accommodated in the exterior accommodating groove 32, to restrict the positional offset of the second exterior member 35 without using a separate member, and to reduce costs by simplifying the configuration.

Figure 6B:
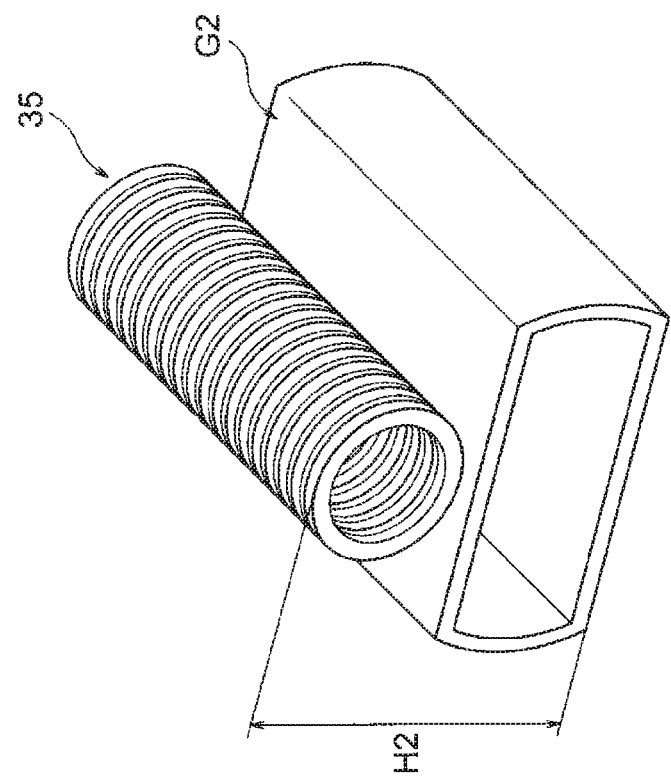
FIG. 6B is a view illustrating a comparative example.
Figure 6A:
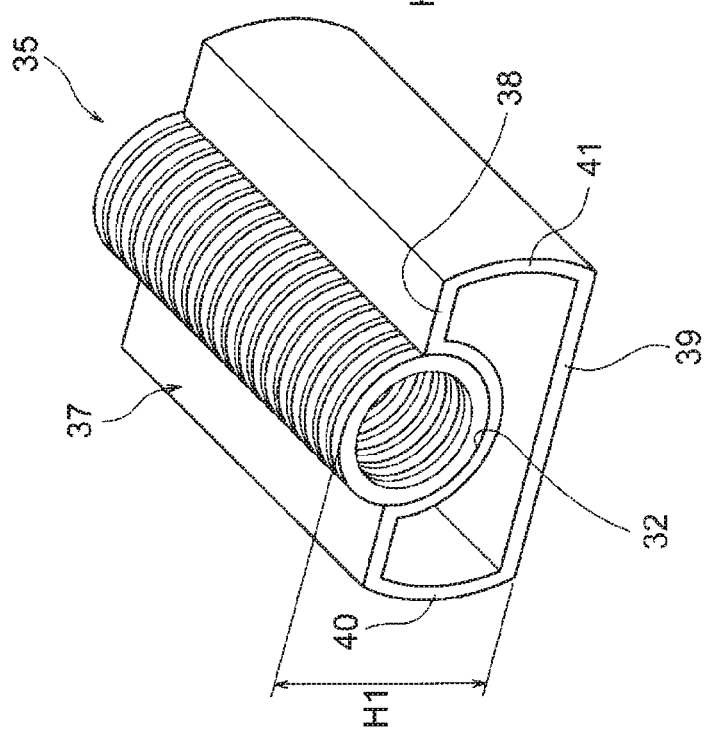
FIG. 6A is a schematic view of still another example of the first exterior member and the second exterior member.

In FIG. 6A, a first exterior member 37 is formed into a flat shape. Specifically, the first exterior member 37 is formed to have horizontal walls 38 and 39 disposed in a vertical direction to face each other, and curved side walls 40 and 41 disposed in a rightward and leftward direction. As illustrated, the first exterior member 37 is formed into a flat shape having a thin vertical thickness. The exterior accommodating groove 32 is formed in the horizontal wall 38 of the first exterior member 37. The second exterior member 35 is accommodated and held in the exterior accommodating groove 32. Accordingly, a vertical width H1 is less than a width H2 when a first exterior member G2 without the exterior accommodating groove 32 illustrated in FIG. 6B and the second exterior member 35 are disposed parallel to each other (H1<H2). As a result, it is possible to reduce the size of a wire harness.

Figure 7B:
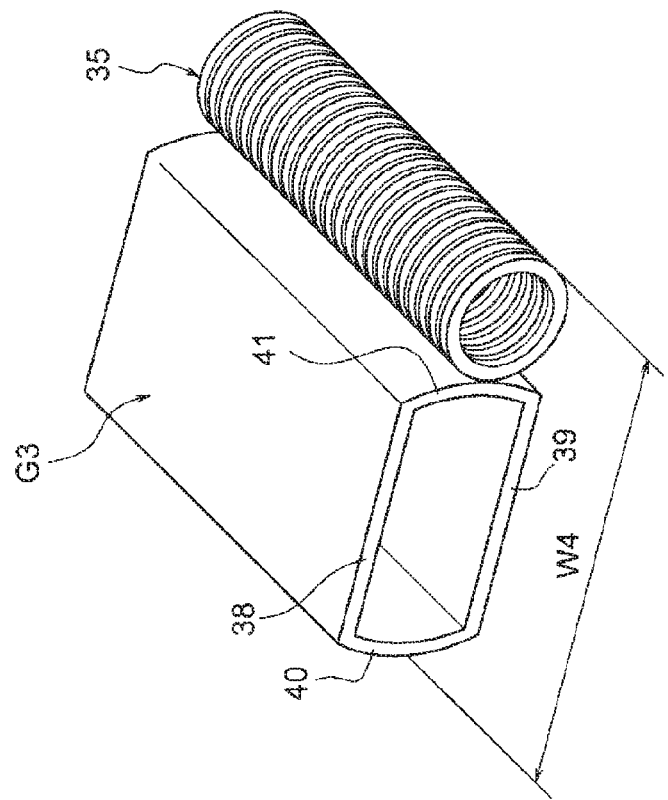
FIG. 7B is a view illustrating a comparative example.
Figure 7A:
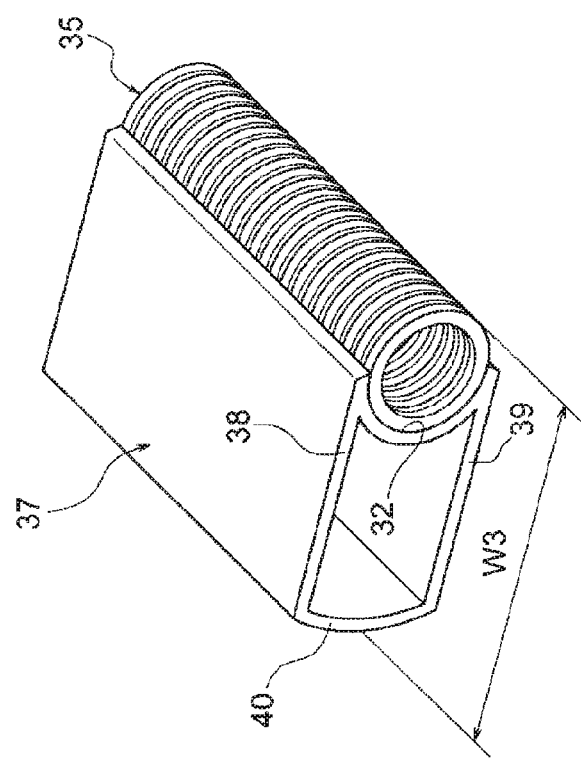
FIG. 7A is a schematic view of still another example of the first exterior member and the second exterior member.

In the example illustrated in FIG. 7A, instead of the curved side wall 41 (refer to FIGS. 6A and 6B), the exterior accommodating groove 32 is formed in the first exterior member 37. The second exterior member 35 is accommodated and held in the exterior accommodating groove 32. Accordingly, a width W3 is less than a width W4 when a first exterior member G3 without the exterior accommodating groove 32 illustrated in FIG. 7B and the second exterior member 35 are disposed parallel to each other (W3<W4). As a result, it is possible to reduce the size of a wire harness.

Figure 8:
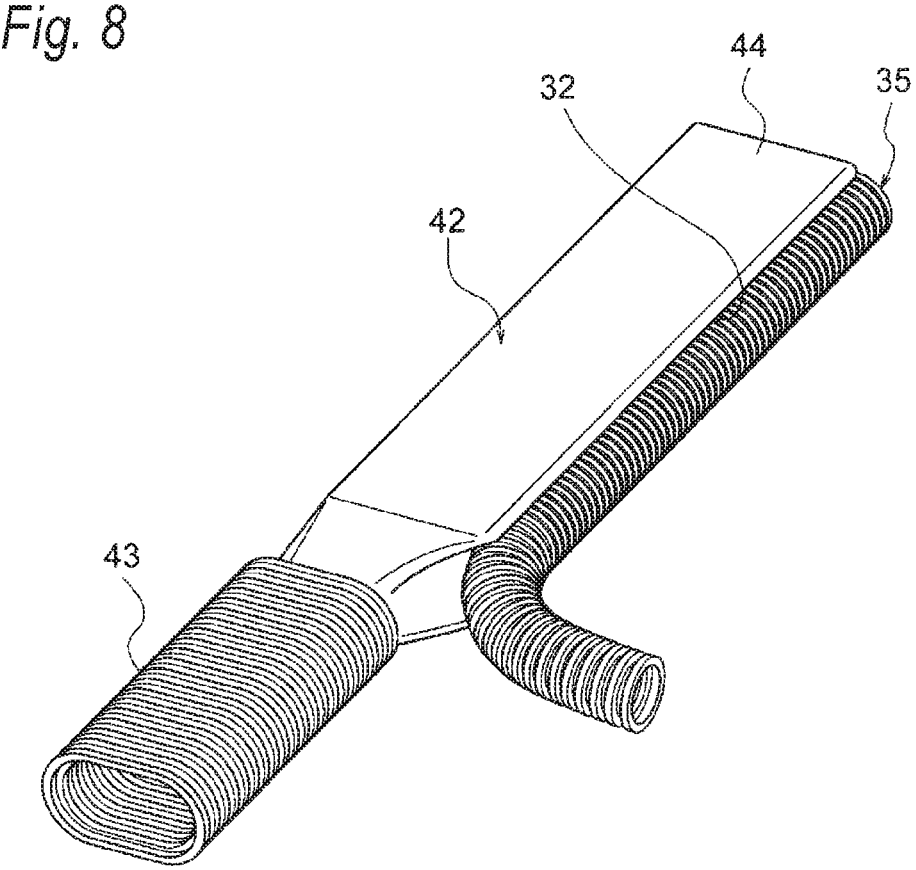
FIG. 8 is a schematic view of still another example of the first exterior member and the second exterior member.

As illustrated in FIG. 8, a first exterior member 42 is formed into a flat shape having a bellows-like flexible tubular portion 43 having flexibility, and a straight tubular portion 44 as a straight-routed portion. The exterior accommodating groove 32 is formed in the flat straight tubular portion 44 at the same position as in the example illustrated in FIG. 7A. The second exterior member 35 is accommodated and held in the exterior accommodating groove 32. Accordingly, it is possible to reduce the size of a wire harness, similar to FIGS. 7A and 7B.

The straight tubular portion 44 is a portion required to route the first exterior member 42 straightly, and is formed to have rigidity. Accordingly, in a range in which the first exterior member 42 and the second exterior member 35 are disposed parallel to each other by the use of the exterior accommodating groove 32, it is possible to restrict the path of the second exterior member 35 without using a separate member, and to reduce costs by simplifying the configuration.

Since the first exterior member 42 has a flat shape having a thin vertical thickness, when a wire harness is routed under the vehicle underfloor member 14 (refer to FIG. 1), it is possible to obtain a low profile.

In the wire harness according to the present invention, the exterior accommodating groove is formed in the first exterior member, and accommodates the second exterior member, and the two exterior members are disposed parallel to each other. Accordingly, the width of the wire harness can be reduced to the extent that the exterior accommodating groove of the first exterior member accommodates the second exterior member. In other words, it is possible to reduce the width of the wire harness by the dimension of a depth by which the second exterior member is inserted into the exterior accommodating groove. As a result, according to the present invention, it is possible to further reduce the width and size of the wire harness compared to the related art.

According to the present invention, the holding structure portion is formed in the exterior accommodating groove, and thus, it is possible to prevent the falling off of the accommodated second exterior member from the exterior accommodating groove. According to the present invention, it is possible to hold the second exterior member without using a separate member, and to reduce costs by simplifying the configuration.

According to the present invention, the positional offset restricting structure portion is formed in the exterior accommodating groove, and thus, it is possible to restrict the axial positional offset of the second exterior member accommodated in the exterior accommodating groove. According to the present invention, it is possible to restrict the positional offset of the second exterior member without using a separate member, and to reduce costs by simplifying the configuration.

According to the present invention, the exterior accommodating groove is formed in the straight tubular portion required to route the first conductive path straightly, and thus, in a range in which the first exterior member and the second exterior member are disposed parallel to each other by the use of the exterior accommodating groove, it is possible to restrict the path of the second exterior member without using a separate member, and to reduce costs by simplifying the configuration.

Naturally, the present invention can be modified in various forms insofar as the modifications do not depart from the purport of the present invention.

What is claimed is:

1. A wire harness comprising:
    a first conductive path;
    a second conductive path;
    a first exterior member having a tubular shape and accommodating the first conductive path; and
    a second exterior member having a tubular shape and accommodating the second conductive path,
    wherein an exterior accommodating groove is formed in a wall of the first exterior member,
    the exterior accommodating groove is recessed inward of the first exterior member, and
    the second exterior member is accommodated in the exterior accommodating groove so as to be parallel to the first exterior member.

2. The wire harness according to claim 1, wherein the exterior accommodating groove holds the second exterior member.

3. The wire harness according to claim 1, wherein a positional offset restricting structure portion restricting an axial positional offset of the second exterior member is provided in the exterior accommodating groove.

4. The wire harness according to claim 1, wherein the first exterior member includes a straight tubular portion in which the first conductive path is arranged straightly, and
    the exterior accommodating groove is formed in the straight tubular portion.

5. The wire harness according to claim 1, wherein a shape of the exterior accommodating groove is conformed to a part of an exterior shape of the second exterior member.

* * * * *